US008327900B2

(12) United States Patent
Stauffer et al.

(10) Patent No.: US 8,327,900 B2
(45) Date of Patent: Dec. 11, 2012

(54) INDUCTION CONNECTING SLEEVE FOR CONNECTING WELDABLE THERMOPLASTIC ELEMENTS BY MEANS OF FUSION

(75) Inventors: Erich Stauffer, Lucerne (CH); Ulrich Gubler, Rotkreuz (CH); Pius Barmet, Rotkreuz (CH)

(73) Assignee: Leister Technologies AG, Kagiswil (CH)

( * ) Notice: Subject to any disclaimer, the term of this patent is extended or adjusted under 35 U.S.C. 154(b) by 204 days.

(21) Appl. No.: 12/571,550

(22) Filed: Oct. 1, 2009

(65) Prior Publication Data

US 2010/0084097 A1    Apr. 8, 2010

(30) Foreign Application Priority Data

Oct. 2, 2008   (EP) .................................... 08017352

(51) Int. Cl.
*B29C 65/02* (2006.01)
(52) U.S. Cl. .................................................. 156/379.8
(58) Field of Classification Search ............... 156/379.6, 156/379.7, 379.8
See application file for complete search history.

(56) References Cited

U.S. PATENT DOCUMENTS 5,200,587 A * 4/1993 Fang ............................ 219/633

FOREIGN PATENT DOCUMENTS

| DE | 1 291 109 | | 3/1969 |
| DE | 1291109 B | * | 3/1969 |
| DE | 32 26 575 | | 3/1984 |
| DE | 199 41 084 | | 3/2001 |
| EP | 0 480 053 | | 4/1992 |
| EP | 0 909 367 | | 4/1999 |
| JP | 5-118486 | | 5/1993 |
| WO | 98/37353 | | 8/1998 |

OTHER PUBLICATIONS

Machine Translation of DE 1291109 B, Mar. 1969.*
European Search Report for corresponding Application No. EP 08 01 7352 dated Feb. 11, 2009.

* cited by examiner

*Primary Examiner* — Daniel McNally
(74) *Attorney, Agent, or Firm* — Renner, Otto, Boisselle & Sklar, LLP

(57) ABSTRACT

An induction connecting sleeve for connecting weldable thermoplastic elements by means of fusion, with at least two sockets for the insertion of connection sections of the thermoplastic elements to be connected, and with an induction heating element embedded in the sockets, with operative sections of the induction heating element surrounded completely by a weldable thermoplastic material, and with the induction heating element arranged coaxially to the sockets. The induction heating element may be manufactured of metallic material with spring characteristics and to embed it under pre-tension in the thermoplastic material of the sockets. When the induction heating element is heated and the thermoplastic material of the socket of the induction connecting sleeve is plasticized, the induction heating element relaxes which causes radial pressure to build towards the connection section.

6 Claims, 3 Drawing Sheets

INDUCTION CONNECTING SLEEVE FOR CONNECTING WELDABLE THERMOPLASTIC ELEMENTS BY MEANS OF FUSION

CROSS-REFERENCE TO RELATED APPLICATION

The present application claims priority under 35 USC §119 to European Patent Application No. 08 017 352.9 filed on Oct. 2, 2008, the entire disclosure of which is incorporated herein by reference.

TECHNICAL FIELD OF THE INVENTION

The invention concerns an induction connecting sleeve for connecting weldable thermoplastic elements by means of fusion, with at least two sockets for the insertion of connection sections of the thermoplastic elements to be connected, and with an induction heating element embedded in the sockets, with operative sections of the induction heating element surrounded completely by a weldable thermoplastic material, and with the induction heating element arranged coaxially to the sockets.

DESCRIPTION OF THE RELATED ART

It is known that thermoplastic elements, for example plastic tubes in the form of rigid structures, can be joined permanently by means of various plastic welding methods. A plastic connecting sleeve made of a weldable thermoplastic material into which the connection sections of the thermoplastic elements that are located at the ends of the tubes are inserted and are connected with each other by means of local heating under pressure, thereby forming a seal, is commonly used for this purpose. The heating causes the thermoplastic elements to melt and fuse with each other and the plastic connecting sleeve. Several conventional devices and processes for this are already available that use hot-melting, electrical melting, or induction melting methods, for example.

In a known induction melting process for connecting a plastic tube and a plastic fitting, an induction heating element is molded into the thermoplastic fitting. The flow of electricity through the heating element is induced by a primary induction coil that is arranged around the part of the fitting containing the induction heating element. The temperature of the induction heating element is increased until the material of the plastic fitting becomes soft and melts, which produces a fused connection between the plastic fitting and the plastic tube. Plastic fittings with an embedded induction heating element will be referred to as induction connecting sleeve below.

In principle, there are two types of induction connecting sleeves, those with an induction-capable metal insert and those made of an induction-capable plastic material. Induction connecting sleeves with a metal insert or with embedded ferromagnetic plastic particles as induction heating element are known from the prior art in a multitude of embodiments. Generally, preference is given to induction connecting sleeves with a metal insert that are heated primarily by means of eddy currents. For operating the primary induction coil, alternating currents in the kilohertz range are sufficient, which significantly simplifies the design of the excitation device. In contrast, the excitation devices for an induction connecting sleeve with a ferromagnetic plastic matrix are considerably more costly. Because the ferromagnetic particles in the plastic matrix are small they cannot be heated by induced eddy currents but only by the magnetic polarity reversal of the ferromagnetic particles. This requires considerably higher frequencies in the megahertz range that make the excitation devices more expensive.

Examples of the induction melting process and of induction melting devices are described in EP 0 480 053 B1 and EP 0 909 367 B1. The induction connecting sleeves proposed by these have in their socket a straight annular cylindrical component of metal serving as induction heating element. The induction heating element may be implemented as a solid-surface or lattice-type element. In order to ensure a secure fused connection between the connection sections of the thermoplastic elements to be connected and the induction connecting sleeve it is necessary that, after the generation of a plastic fusion zone that hardens when cooling, the surfaces to be fused have a certain contact pressure relative to each other when solidifying. A sufficient exertion of pressure on the fusion connection zone guarantees a permanently liquid and gas-tight joint at the welding point.

Common plastic tubes are manufactured in an extrusion process with large manufacturing tolerances so that the required contact pressure is not ensured even with precision-made induction connecting sleeves. As a result, when the plastic tubes are joined with the induction connecting sleeve, an annular gap forms between them that needs to be completely closed during the fusion process in order to produce a secure connection and seal in the fusion connection zone. This usually requires special devices that exert radial pressure on the fusion connection zone from the outside.

The invention addresses the problem of proposing an apparatus and method where even in case of an imprecise fit of the parts to be fused, a liquid-tight and sufficiently strong fused connection can be achieved by clamping devices acting from the outside.

SUMMARY OF THE INVENTION

The induction heating element according to the invention is made of a metallic material with spring characteristics and is placed pre-tensioned in the thermoplastic material of the sockets. The induction heating element is held pre-tensioned by the thermoplastic material of the sockets as long as the thermoplastic material is not plasticized. During the plastic welding process, the thermoplastic material of the socket becomes soft through heating and therefore deformable so that the tension of the induction heating element is relieved.

The direction of the pre-tension of the induction heating element is selected to be the opposite of the desired direction of the required contact pressure, which causes the tension of the induction heating element to relax in the direction of the fusion connection zone. Due to the pressure of the induction heating element exerted towards the connection section of the thermoplastic element, the melted thermoplastic material of the socket that faces the thermoplastic element is pressed against the connection section of the thermoplastic element which securely closes the annular gap between the socket and the connection section.

The pre-tension of the induction heating element can be produced by pre-tensioning the induction heating element while being molded into the sleeve, or by expanding the entire sleeve after the molding-in process, with the plastic material being heated to just below its melting temperature.

The induction connecting sleeve may be shaped strictly as a connecting sleeve with two opposed sockets, or as a branch fitting with three or more sockets, with sockets of different shape and/or size being possible. The individual sockets may be designed to overlap the connection sections of the thermoplastic elements to be connected only externally, only internally, or internally and externally. The direction of the pre-tension of the induction heating element depends on the type of overlap.

A good mechanical alignment of the connection section relative to the socket, and a good mechanical connection of the connection section relative to the socket result when the socket overlaps a wall of the connection sections on both sides, and is fused with these on both sides. With an induction connecting sleeve of this design, the induction heating element is advantageously designed so that it also overlaps the wall on both sides, with its pre-tension being the opposite on the two sides.

Preferably, the induction heating element is ring- or sleeve-shaped, and radially pre-tensioned, at least in sections. The wall of the induction heating element may be solid or perforated. Wall sections with axial slots at the ends are also possible.

In a preferred embodiment of the invention, the induction heating element comprises a strip of material deformed into a cylinder, where an axial longitudinal gap is formed between its facing edges. By enlarging or reducing this longitudinal gap, the induction heating element can be radially pre-tensioned in a simple manner. In addition, an induction heating element of this type is especially easy and inexpensive to produce.

In another preferred embodiment of the invention, the induction heating element comprises a closed cylinder section followed by an axially slotted cylinder section with laminae with radial spring action. A high mechanical radial stability of the induction heating element is achieved by the closed cylinder section. The laminae with radial spring action of the slotted cylinder section may be pre-tensioned radially towards the inside or the outside. It is also possible to provide a corresponding axially slotted cylinder section on both sides of the closed cylinder section.

In one embodiment of the induction connecting sleeve according to the invention, at least two induction heating elements are arranged in the socket, with axial spacing. In this way, the socket can be fused with the associated connection section at several, axially successive points; this has an advantageous effect on the mechanical attachment of the thermoplastic element to the connecting sleeve as well as on the seal between the socket and the connection section when, due to different expansion coefficients, the materials react differently when cooling.

Below, the invention is explained in detail with reference to three embodiments shown in the drawing. Additional characteristics of the invention are given in the following description of the embodiment of the invention in conjunction with the claims and the attached drawing. The individual characteristics of the invention may be realized either individually by themselves or in combinations of several in different embodiments of the invention.

DETAILED DESCRIPTION OF THE INVENTION

Figure 1:
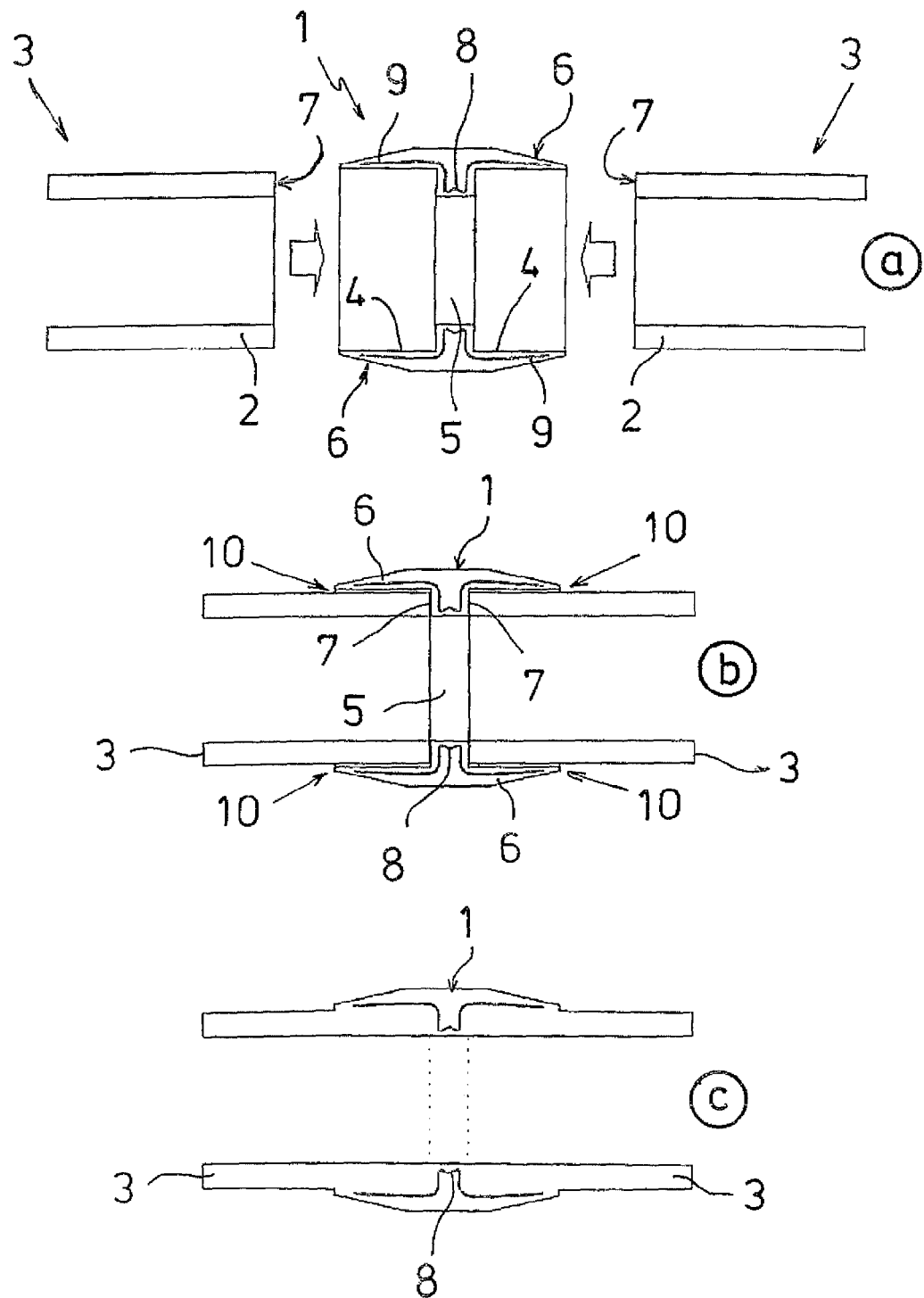
FIG. 1 shows a first induction connecting sleeve according to the invention with a first induction heating element in a longitudinal section view, prior to the insertion of two tube ends (FIG. 1a), after the insertion (FIG. 1b), and after the fusion (FIG. 1c).

In FIG. 1a, FIG. 1 shows the first induction connecting sleeve 1 according to the invention. In FIG. 1b, connection sections 2 of thermoplastic elements 3 in the form of plastic tubes that are to be connected are inserted in the connecting sleeve 1. In FIG. 1c, the plastic tubes 3 are fused with the induction connecting sleeve 1. The induction connecting sleeve 1 has essentially the form of a hollow cylinder with an annular flange 5 protruding from the inner circumferential surface 4 that encloses at the face side two sockets 6 for accepting the connection sections 2. The annular flange 5 serves to butt-join the front faces 7 of the connection sections 2.

Into the thermoplastic plastic material of the induction connecting sleeve 1, an induction heating element 8 shaped similar to a bushing and made of a metallic material with spring characteristics is embedded and is arranged coaxially to the sockets 6 and centered between the sockets 6. End sections 9 of the induction heating element 8 are slightly pre-tensioned radially outward. In order to make this possible, at least the end sections 9 of the induction connecting sleeve 1 have one or several radial slots (not visible in the drawing). During the fusion process, when the tension of the end sections 9 of the induction heating element 8 is relaxed, the annular gap 10 between the connection sections 2 and the socket 6 that is visible in FIG. 1b is closed by material of the socket 6 that is pressed against the connection sections 2 on the outside by the spring-back action of the end sections 9. FIG. 1c shows the resulting fused connection where the induction connecting sleeve 1 is completely fused surface-to-surface with the connection sections 2 of the thermoplastic elements 3.

Figure 2:
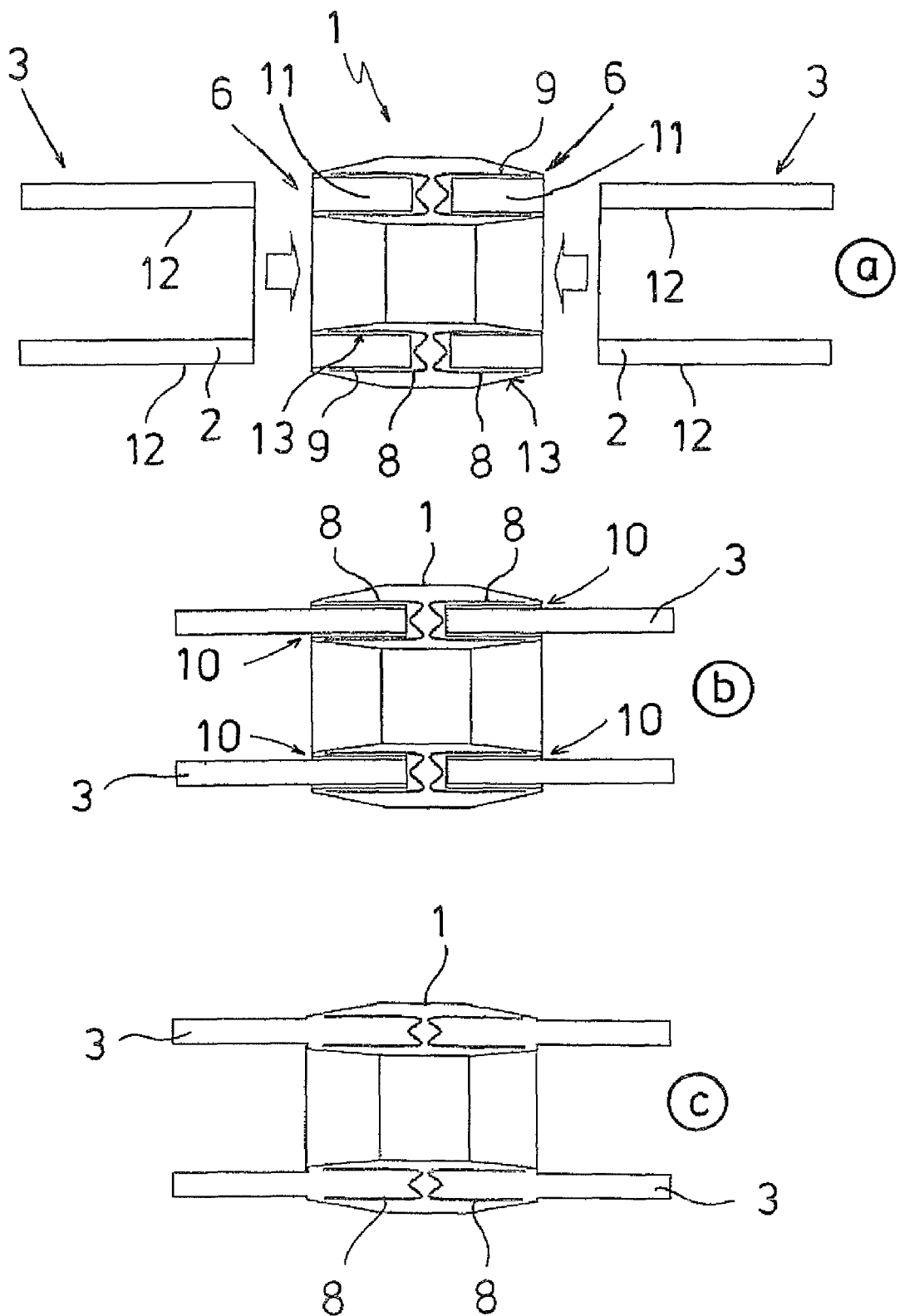
FIG. 2 shows a second induction connecting sleeve according to the invention with a second induction heating element in a longitudinal section view, prior to the insertion of two tube ends (FIG. 2a), after the insertion (FIG. 2b), and after the fusion (FIG. 2c).

In FIG. 2a, FIG. 2 shows the second induction connecting sleeve 1 according to the invention. FIGS. 2b and 2c show the induction connecting sleeve 1 with inserted and non-fused respectively with inserted and fused connection sections 2 of the thermoplastic elements 3 that also consist of plastic tubes. The induction connecting sleeve 1 also has the form of a hollow cylinder with two sockets 6, but with said sockets being implemented as face-side annular grooves 11. The annular grooves 11 are able to accept the connection sections 2 of the plastic tubes 3, and to clamp them on circumferential surfaces 12. The annular groove 11 of the socket 6 is limited by an outer and an inner annular flange 13.

Each of the sockets 6 has a metallic and radially elastically deformable induction heating element 8 that, arranged coaxially to the annular groove 11, extends in the outer and the inner annular flange 13 with end sections 9. The end sections 9 of the induction heating element 8 are shaped similar to the end sections 9 described in FIG. 1, with the end section 9 located in the outer annular flange 13 being pre-tensioned radially towards the outside and/or the end section 9 embedded in the inner radial flange 13 being pre-tensioned radially towards the inside. During the fusion process, when the induction heating element 8 is relaxed, the outer and inner annular gap 10 shown in FIG. 2b is closed with material from the outer and inner annular flanges 13.

Figure 3:
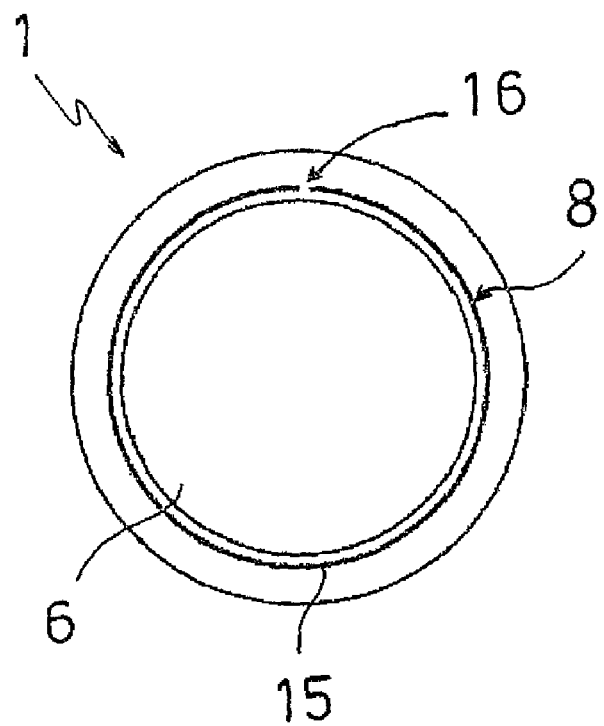
FIG. 3 shows a third induction connecting sleeve according to the invention with a third induction heating element in a cross-section view.

FIG. 3 shows the third embodiment of the induction connecting sleeve 1 according to the invention. The embedded induction heating element 8 is implemented as a simple pressure ring. The pressure ring 8 consists of a material strip 15 that has been deformed to produce a cylinder with an axial longitudinal gap 16 between its facing edges. The pressure ring 8 is pre-tensioned radially outward so that, when the thermoplastic material of the socket 6 melts, it exerts pressure directed inward on a tube-shaped connection section 2 of a thermoplastic element 3 (not shown), thereby closing an existing annular gap between the socket 6 and the connection section 2.

Figure 4:
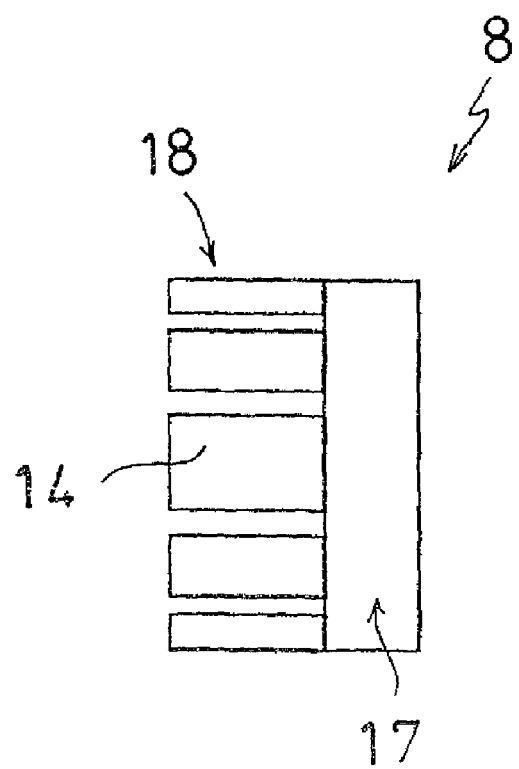
FIG. 4 shows an alternative induction heating element in a longitudinal section view.

FIG. 4 shows an alternative induction heating element 8. The shown induction heating element 8 has a closed cylinder section 17 followed by an axial cylinder section 18 with laminae 14 with radial spring-action. This induction heating element 8 can be used with or without slight modifications for the induction connecting sleeves 1 according to the invention shown in FIGS. 1a and 2a.

Further features of the invention can be found in the description of preferred embodiments of the invention in connection with the claims and the drawings. The single features can be realised alone or several together in embodiments of the invention.

The invention claimed is:

1. An induction connecting sleeve for connecting weldable thermoplastic elements by means of fusion, with at least two sockets for the insertion of connection sections of the thermoplastic elements to be connected, and with induction heating elements embedded in the sockets, with operative sections of the induction heating elements being surrounded completely by a weldable thermoplastic material, and with the induction heating elements arranged coaxially to the sockets, wherein that the induction heating elements are made of a metallic material with spring characteristics and are placed under pre-tension in the thermoplastic material of the sockets, wherein thermoplastic material of the sockets is present between a contour of the induction heating elements and circumferential surfaces of the sockets being assigned to the connection sections, and the induction heating elements have inner diameters in a tension condition and also in a tension free condition that are greater than inner diameters of the sockets of the induction sleeve at positions of the sockets at which the induction heating elements are arranged.

2. The induction connecting sleeve according to claim 1, wherein the induction heating elements are ring-shaped or sleeve-shaped and are radially pre-tensioned, at least in sections.

3. The induction connecting sleeve according to claim 2, wherein the induction heating elements comprise a strip of material deformed to produce a cylinder, with an axial longitudinal gap between their facing edges.

4. The induction connecting sleeve according to claim 2, wherein the induction heating elements comprise a closed cylinder section followed by an axially slotted cylinder section with laminae with radial spring action.

5. The induction connecting sleeve according to claim 1, wherein the induction heating elements overlap a wall of the connection section of the thermoplastic element on both sides.

6. The induction connecting sleeve according to claim 1, wherein at least two induction heating elements are arranged with axial spacing in the socket.

* * * * *